(No Model.) 5 Sheets—Sheet 1.

J. J. WOOD.
AUTOMATIC REGULATOR FOR DYNAMO ELECTRIC MACHINES.

No. 418,302. Patented Dec. 31, 1889.

WITNESSES:
Geo. W. Breck
C. E. Ashley

INVENTOR:
James J. Wood,
By his Attorneys,
Arthur G. Fraser & Co.

(No Model.) 5 Sheets—Sheet 2.
J. J. WOOD.
AUTOMATIC REGULATOR FOR DYNAMO ELECTRIC MACHINES.
No. 418,302. Patented Dec. 31, 1889.

WITNESSES:
Geo. W. Breck.
C. E. Ashley

INVENTOR:
James J. Wood,
By his Attorneys,
Arthur C. Fraser & Co.

(No Model.) 5 Sheets—Sheet 4.
J. J. WOOD.
AUTOMATIC REGULATOR FOR DYNAMO ELECTRIC MACHINES.

No. 418,302. Patented Dec. 31, 1889.

(No Model.) 5 Sheets—Sheet 5.

J. J. WOOD.
AUTOMATIC REGULATOR FOR DYNAMO ELECTRIC MACHINES.

No. 418,302. Patented Dec. 31, 1889.

WITNESSES:
Geo. W. Breck
C. E. Ashley

INVENTOR:
James J. Wood,
By his Attorneys,

UNITED STATES PATENT OFFICE.

JAMES J. WOOD, OF BROOKLYN, NEW YORK.

AUTOMATIC REGULATOR FOR DYNAMO-ELECTRIC MACHINES.

SPECIFICATION forming part of Letters Patent No. 418,302, dated December 31, 1889.

Application filed April 27, 1889. Serial No. 308,890. (No model.)

*To all whom it may concern:*

Be it known that I, JAMES J. WOOD, a citizen of the United States, residing in Brooklyn, in the county of Kings and State of New York, have invented certain new and useful Improvements in Automatic Regulators for Dynamo-Electric Machines, of which the following is a specification.

This invention relates to regulators for automatically governing the output of dynamo-electric machines, which are employed most commonly for regulating the current supplied by machines of the constant-current class, or such as are used for feeding arc lamps in series.

The invention is also applicable in part to regulators for machines generating constant potential.

The class of automatic regulators to which this invention pertains is that wherein the regulation is effected by shifting the collecting-brushes to different positions around the commutator, moving toward or from the neutral line or position of maximum difference of potential in compensation for changes occurring in the external circuit. As applied to constant-current machines the brushes are shifted from time to time to such positions nearer to or farther from the neutral line that they take off a constant current notwithstanding the variations in the resistance of the external circuit. Automatic regulators of this character are of two kinds: first, those in which the brush-carrier or yoke is connected to the armature or moving member of the electro-magnet, solenoid, or other electro-motive device which is installed in the external circuit and responds to changes of current therein, the brushes consequently moving simultaneously with and to an extent proportional to the movement of such moving member, and, second, those in which the brushes are shifted by means of a power-driven device, the clutching of which to the source of power in one direction or the other is controlled by the movements of the armature or moving member of the electro-motive device, so that the movements of the brushes forward or back follow as a result of the excitation of the regulating electro magnet or motive device becoming greater or less than the normal. The regulator provided by my present invention is of the latter kind.

My invention has for its object to improve the construction of such regulators in order to render them more sensitive, more durable, and more easily and perfectly adjustable, and to provide improved means for preventing the undue action of the regulator when the machine is overloaded.

In my improved regulator the collecting-brushes are mounted on a suitable yoke or carrier and connected through a suitable train of gears or by means of other mechanical connections to a friction-wheel. Mounted adjacent to this friction-wheel, and normally slightly out of contact therewith, are two friction-rollers revolving in opposite directions by being connected to a source of power, preferably by being geared to the armature-shaft, and so mounted as to be movable toward and from the frictional surface of said friction-wheel. The regulating-magnet, solenoid, or other electro-motive device which responds to changes in the external circuit has its moving member connected to these friction-rollers in such manner that by its movement in one direction or the other it shall move one or the other of said rollers into frictional engagement with the friction-wheel, and thereby drive the latter in one direction or the other to communicate an advancing or retreating movement to the brushes.

I have shown my invention as applied to a Gramme-ring dynamo of the well-known Wood type of construction, although it is obviously applicable to other types and styles of dynamos.

In the drawings, A designates the frame of the machine; B B, the field-magnet coils; C C, the field-magnet pole-pieces; D, the armature; E, the commutator; F F, the main commutator-brushes, and G G the auxiliary or supplemental commutator-brushes.

Figure 2:
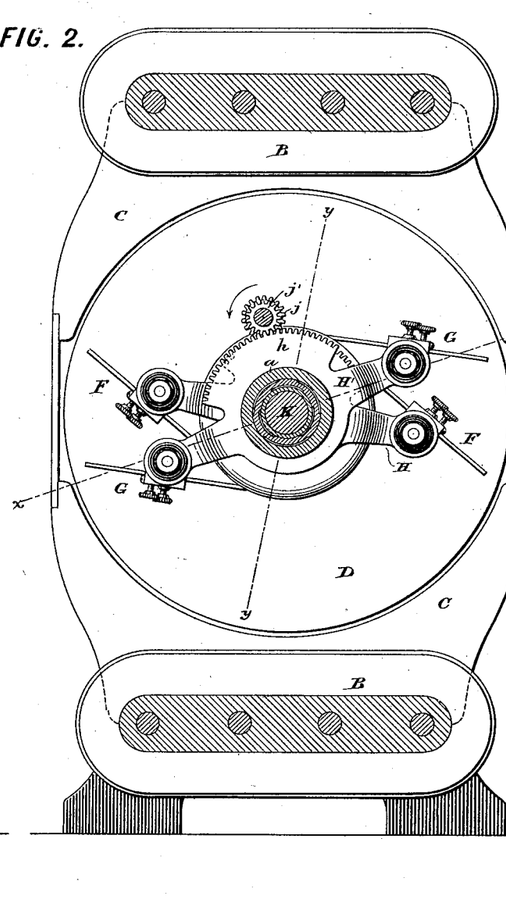
Fig. 2 is an elevation looking in the same direction, cut in vertical section on the line 2 2 in Fig. 3, in order to show the commutator and collecting brushes and their yokes.
Figures 3, 4:
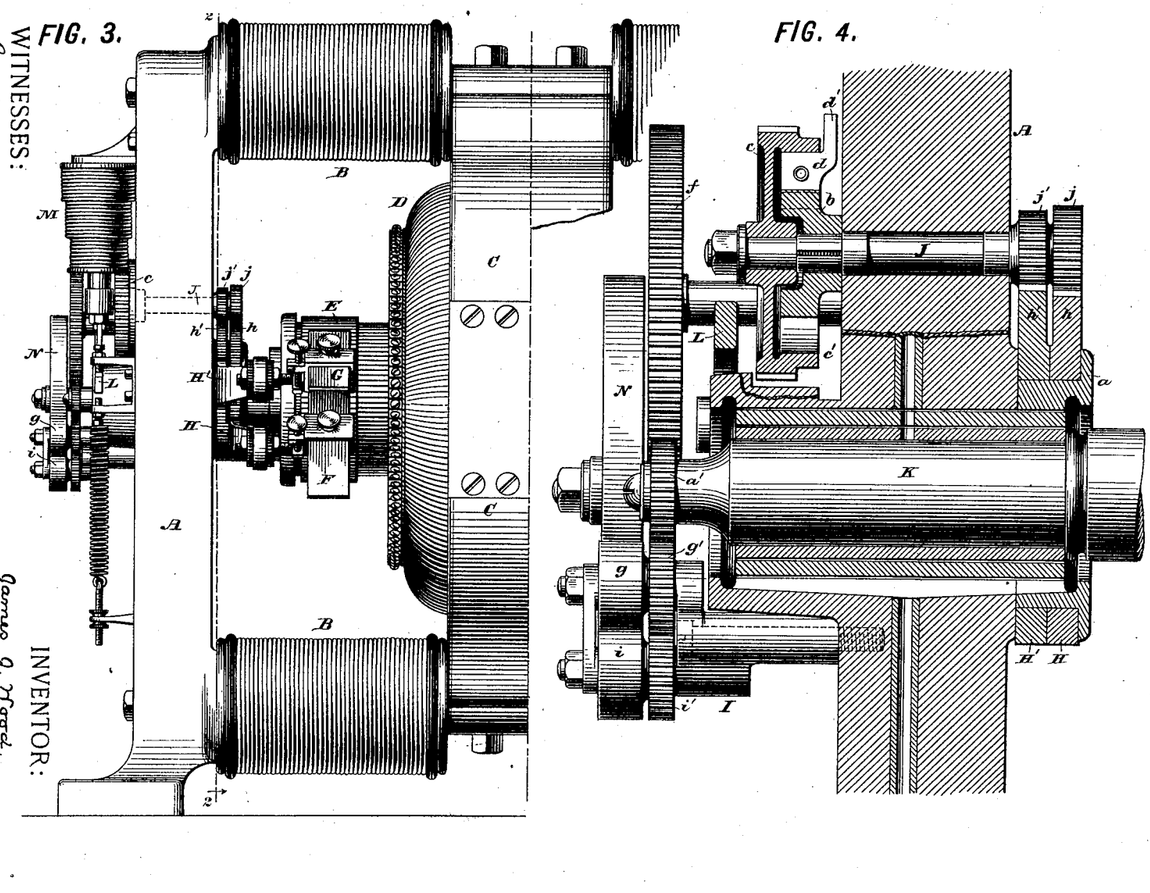
Fig. 3 is a side elevation of one-half of the machine, showing the regulator and commutator.
Fig. 4 is a vertical section on a larger scale cut in the two planes denoted by the lines 4 4 in Figs. 1 and 5.

The main commutator-brushes F F are carried, as usual, in insulated holders mounted on opposite arms of the brush-carrying yoke or lever H, which turns on an inward prolongation or boss $a$, formed on or fixed to the inner side of the end frame A, Fig. 4, as usual. The supplemental brushes G G are carried by insulated holders mounted on opposite arms of a supplemental carrier-yoke H', mounted in the same way as the yoke H. These brush-carriers H and H' are formed, respectively, with toothed sectors $h$ and $h'$, which mesh, respectively, with pinions $j$ and $j'$, fixed on a shaft J, which passes through the main frame A, as shown in Fig. 4, and has keyed or otherwise fixed on its projecting portion a disk $b$. (Shown detached in Fig. 8.) A gear-wheel $c$ is mounted to turn loosely on the end portion of the shaft J, in front of the disk $b$, and is formed with a flange $c'$, extending backwardly and inclosing the disk $b$ within it. The disk $b$ has pivoted to it two friction-pawls $d$ and $e$, pressed apart by an intervening spring, and the outer ends or frictional surfaces of which engage the inner surface of the flange $c'$. The two pawls $d$ $e$ are so mounted as to bite or grip the flange in opposite directions, so that normally the rotation of the gear $c$ in either direction will communicate rotary motion to the disk $b$ and shaft J, and hence to the pinions $j$ $j$ and to the brush-carriers, thereby advancing or retracting the brushes relatively to the neutral line or line of maximum difference of potential of the commutator, which line is indicated by $x$ $x$ in Figs. 2 and 7. When the machine is running with its maximum load, so that it is giving the utmost current, the main brushes F F touch the commutator on this line while the supplemental brushes G G are in advance thereof, so as to short-circuit the coils of the armature that are in connection with the intervening commutator-segments in order to prevent sparking, as is well understood. In the extreme opposite condition, when the circuit includes the least resistance and the machine is giving out its minimum current, the main brushes F F are moved forward until they touch the commutator on the minimum line indicated at $y$ $y$ in Figs. 2 and 7. In this latter position the supplemental brushes G G are still in advance of the brushes F F, but are at a less distance in advance thereof, so as to short-circuit fewer coils. During the advancing and retractile movements of the brushes the main brushes F F move at greater speed than the supplemental brushes G G, in order by this differential movement to preserve the proper proportional distance between the brushes in all intermediate positions. The differential brush movements are imparted by the pinions $j$ $j'$ being of different pitch, as well as the sectors $h$ $h'$, the sector $h$ being driven at greater speed than the sector $h'$. This differential adjustment of the brushes is already known in other analogous regulators.

The gear-wheel $c$ is geared or connected directly or indirectly to a friction-wheel N. This connection is preferably made through the medium of a pinion $f'$, with which the gear $c$ meshes, and which is fixed to a gear-wheel $f$, the toothed sector of which meshes with a pinion $f^2$, fixed on the hub of the wheel N.

Figure 1:
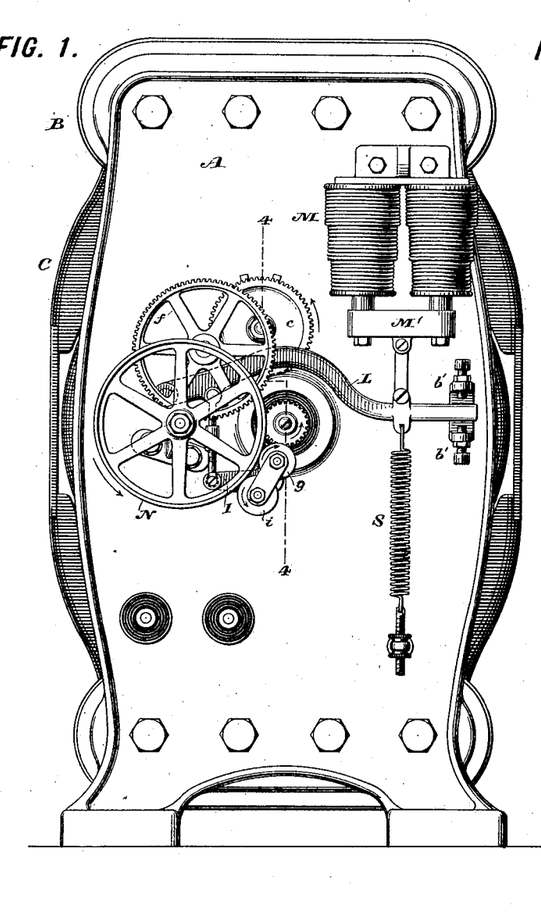
Figure 1 of the accompanying drawings is an elevation of the end of the dynamo to which the regulator is applied.
Figures 5, 6:
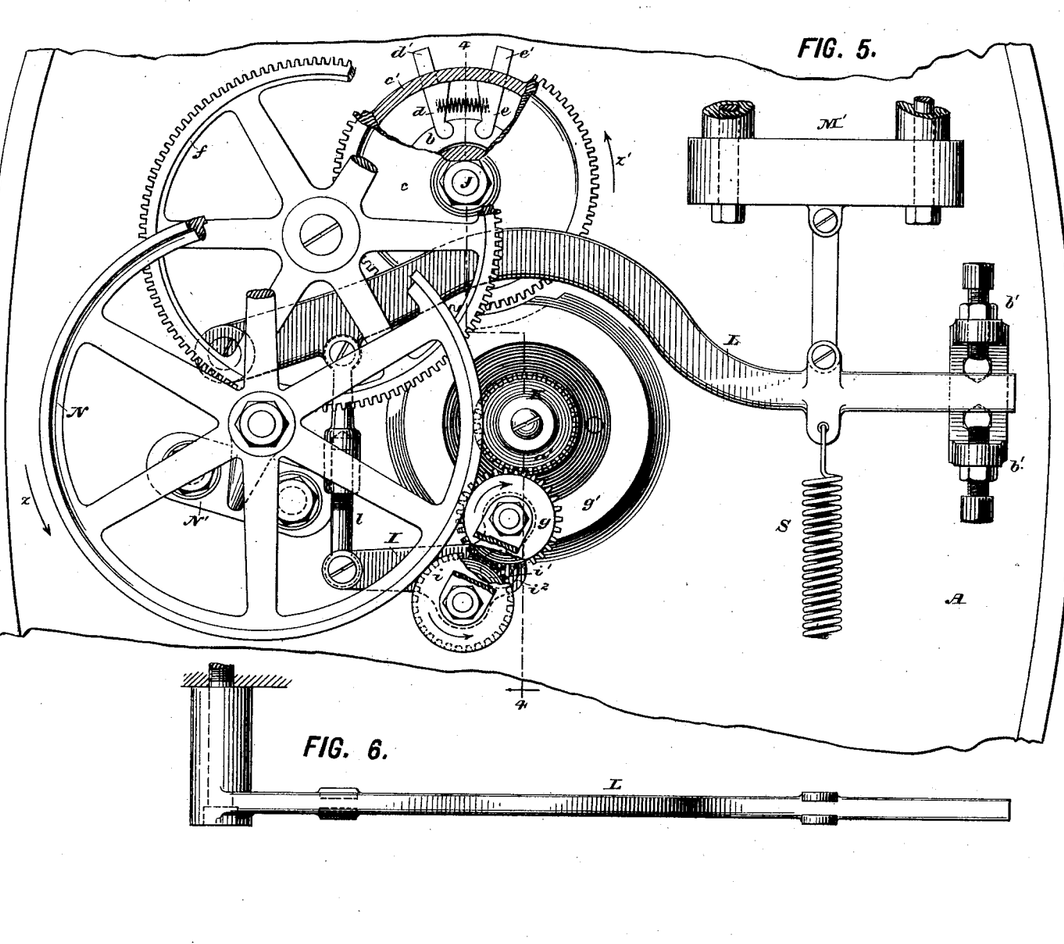
Fig. 5 is an elevation similar to Fig. 1, on the same scale as Fig. 4, and partly broken away or dissected to better show the construction.
Fig. 6 is a plan of the operating-lever.
Figures 7, 8:
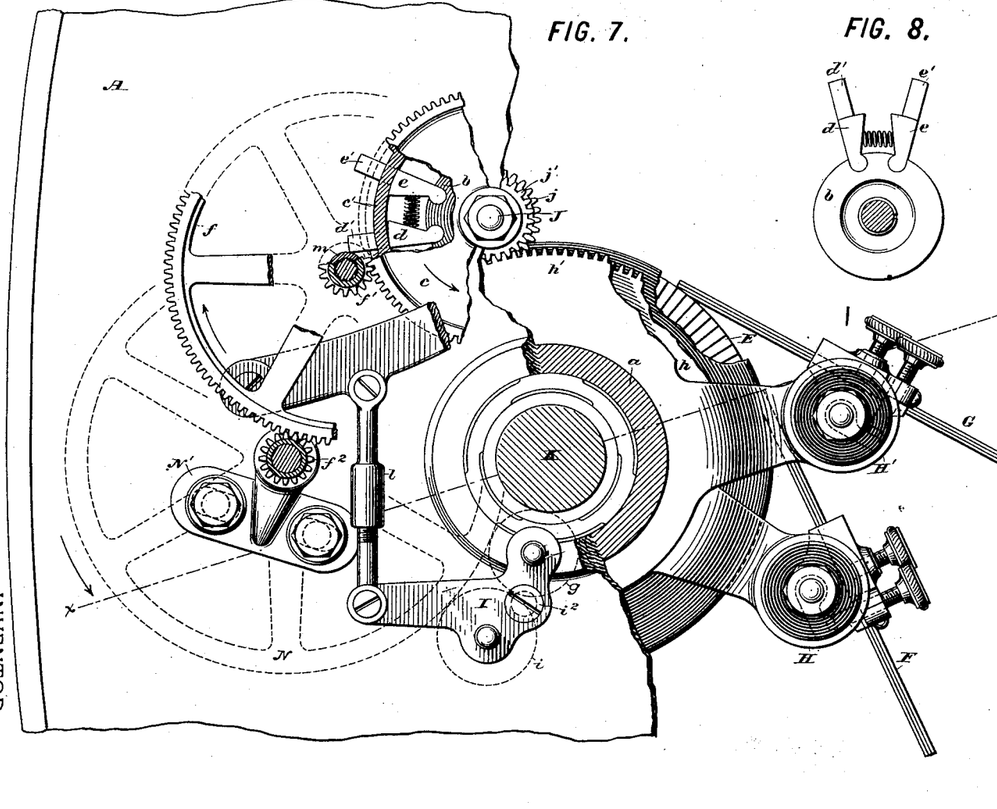
Fig. 7 is an elevation similar to Fig. 5, but further dissected or broken away in order to show the connection between the regulating-train and the commutator-brushes, and showing the parts in a different position.
Fig. 8 is a front elevation of the friction-pawls and their carrying-disk removed. The remaining views illustrate modifications.

The wheel N has a frictional surface or tread upon its periphery, and close to but normally out of contact with this surface stand two friction-rollers $g$ and $i$, which are revolved continuously in opposite directions from a source of power, preferably by being geared to the armature-shaft K. A gear-wheel $a'$, fixed on the end of the armature-shaft, drives a gear $g'$, fixed to the friction-roller $g$, which in turn drives a gear $i'$, fixed to the friction-roller $i$, whereby these two rollers are driven in opposite directions, as indicated by the arrows marked on them in Figs. 1 and 5. The rollers $g$ and $i$ turn freely on studs projecting from a lever I, fulcrumed at $i^2$ on a screw-stud fixed in the frame A, as best shown in Fig. 7. The fulcrum of the lever being between the two rollers, the vibrating of the lever in either direction serves to bring one or other of the two rollers into contact with the frictional periphery of the wheel N, whereby the latter may be driven in either direction, according as one or the other of the rollers is pressed against it. The lever I is connected by a link $l$ to the main operating-lever L, which is pivoted on a screw-stud at its left-hand end, as shown in Figs. 5 and 6, and plays at its right-hand end between two screw-stops $b'$ $b'$. This lever L is acted upon by the regulating electro-magnet M, which is preferably in the form of a solenoid, the movable core M' of which is connected by a link to one side of the lever, while to the opposite side of the lever is connected a retracting-spring S, which is adjustable by a screw-stem and nuts in the usual manner.

The regulating-magnet is installed with its coils in the main or line circuit, so that it is traversed by the entire current and is influenced directly by fluctuations therein, and its movable member or core is acted on with a force proportional to such fluctuations, and by reason of the direct mechanical connection of this core to the support for the rollers $g$ and $i$ these latter, when moved into tractive contact with the friction-wheel, are pressed against it with a force depending on the extent of fluctuation from the normal current.

The operation is as follows: During the normal running of the dynamo the retractive pull of the spring S is exactly counterbalanced by the attraction of the solenoid M for its core, and the lever L occupies the position shown in Fig. 1, its free end standing midway between the stop-screws $b'$ $b'$. In case of an increase of resistance on the circuit the consequent decrease of current weakens the solenoid M and the spring S pulls the lever L downwardly, its motion being communicated through the link $l$ to the lever I, whereby the latter is tilted in such direction as to bring the friction-roller $g$ against the periphery of the friction-wheel N, whereby this wheel is driven in the direction of the arrow $z$ in Fig. 5, and its motion is communicated to the wheel $c$, which is driven in the direction of the arrow $z'$. The rotary movement of the wheel $c$ is communicated through the pawl $d$ to the disk $b$, which it turns in the same direction, thereby rotating the shaft J and pinions $j$ $j'$ and moving the brush-yokes in the direction indicated by the arrow marked on them in Fig. 2, whereby the brushes are carried toward the position of maximum current. This movement of the brushes causes them to take off continually a larger current until the normal volume of current is restored to the circuit, whereupon the regulating magnet or solenoid M resumes its normal energy and lifts the lever L again to its mid-position, thereby moving the friction-roller $g$ out of contact with the wheel N and stopping the further movement of the brushes. Should the momentum of the parts have carried the brushes too far, or should any change occur in the circuit whereby the current is too strong, the regulating-magnet will be energized to above the normal, and its pull will preponderate over that of the spring S, so that it will lift the lever L to above its mid-position, and will consequently move the friction-roller $i$ into contact with the wheel N, thereby rotating the latter in the opposite direction and communicating this movement through the wheel $c$ and pawl $e$ to the disk $b$ and shaft J and to the brush-yokes, whereby the latter are moved in the opposite direction, so as to carry the brushes away from the maximum line and toward the minimum line $y$ $y$. As the brushes move in this direction they take off continually less current until the current on the line is so far reduced as to bring the regulating-magnet M down to the normal excitation, whereupon it relaxes its pull, and the lever L is restored to its normal position. The regulator thus compensates for any change occurring in the resistance of the circuit, as well as for variations in the current due to an increase or decrease in the speed of the machine.

As there is some lost motion or clearance between the rollers $g$ $i$ and the wheel N, the rollers are not moved into contact with the wheel by very minute fluctuations of current, such fluctuations resulting merely in short vibratory movements of the lever. By thus preventing over-sensitiveness of the regulator the alternate over-augmentation and over-reduction of current incident to some prior regulators are avoided.

It is more important that an automatic regulator shall act quickly to reduce the current in case of a considerable reduction in the resistance of the circuit than that it shall quickly build up the current in case of a considerable increase in resistance, since an excessive current is attended with considerable danger to the dynamo and lamps. For this reason I construct the regulator so that it shall be driven at a higher speed to cut down the current than to increase it. This result is accomplished by driving the friction-roller $i$ at a surface speed faster than that of the friction-roller $g$. This may be accomplished either by making the gear $i'$ smaller than the gear $g'$ or by making the friction-roller $i$ larger than the roller $g$, or, by preference, by a combination of both methods, as in the construction shown. (See Fig. 5.) I prefer to so proportion the speeds that the greater leverage or mechanical advantage derived from the slower roller $g$ in moving the brushes toward the maximum shall compensate for the greater resistance experienced in moving the brushes in the direction opposite to that of the commutator's rotation as compared with the movement of the brushes toward the minimum position, wherein the drag of their frictional contact with the commutator tends to assist their movement.

In case the dynamo is overloaded—that is to say, in case the resistance on the circuit is so great that the dynamo, at the speed it may be running, is unable, when the brushes are at the maximum position, to generate sufficient electro-motive force to supply the normal current against this resistance—the regulator will constantly strive to carry the brushes beyond the maximum position. Since the movement of the brushes beyond the maximum would carry them to where they would take off less current, it is necessary that means should be provided for preventing this result. This means consists of the cooperation of the clutch-pawl $d$ with the disk $b$ and flange $c'$, between which it intervenes, and with a fixed stop, which is encountered by this pawl at the instant the brushes reach the maximum position, and which throws it out of engagement, so that it no longer serves to communicate the motion of the wheel $c$ to the disk $b$ and thence to the brushes; or, more broadly stated, the device consists of means for disconnecting the friction-wheel N from the commutator-brushes at the instant that the latter reach the maximum position, so that the subsequent rotation of the wheel N is impotent to carry the brushes any farther. This disengagement might be effected in various ways by means of almost any of several known kinds of friction-clutches or positive-action clutches; but I prefer the friction-clutch arrangement shown. The pawl $d$ has an arm $d'$ projecting from it behind the flange $c'$, as shown in Fig. 4. The movement of the pawl in the direction of the arrow $z'$ in Fig. 5 carries the pawl around until its arm $d'$ strikes a stop $m$, which prevents its further movement and slightly tilts it so that its frictional face is disengaged from the inner surface of the flange $c'$, as shown in Fig. 7. The continued motion of the wheel $c$ is no longer communicated to the disk $b$ and shaft J; but so long as the machine remains overloaded the wheels N, $f$, and $c$ continue to revolve freely in the direction of the arrows in Fig. 7, the flange $c'$ slipping against the frictional surface of the pawl $e$. The instant, however, that the current rises above the normal, so that the wheels N, $f$, and $c$ commence to revolve in the opposite direction, the pawl $e$ bites or engages with the flange $c'$, and the motion is immediately communicated to the brushes to carry them away from the maximum position and cut down the current; hence the disconnection of the gearing to prevent carrying the brushes beyond the maximum does not prevent their being instantly shifted in the opposite direction when necessary to reduce the current.

The stop $m$ in the construction shown consists of the base of the stud on which the wheel $f$ and pinion $f'$ turn; but this is not essential, as a separate pin may be substituted.

The proportions of the pinions $j j'$ to the sectors $h h'$ are such that the shaft J executes a little less than one revolution in shifting the brushes from the maximum to the minimum positions; hence when the brushes reach the minimum position the pawl $e$ is thrown out of engagement by the abutment of its arm $e'$ with the stop $m$, whereby in like manner the regulator is prevented from carrying the brushes beyond the minimum.

The following adjustments are provided: The friction-wheel N is made adjustable toward and from the friction-rollers $g$ $i$ by being mounted on a bracket N', which is fastened to the end frame A by tap-screws passing through elongated holes or slots in its base, whereby by loosening these screws the bracket may be moved toward or from the friction-rollers, carrying the wheel N with it. The link $l$ is made in two parts screwing together, so that its length may be adjusted in order to adjust the relative positions of the levers L and I, or, in other words, to enable the rollers $g$ and $i$ to be adjusted to positions equally distant from the surface of the wheel N when the lever L is in its mid-position. In addition there are the usual adjustments for the tension of the spring S and for the play of the lever L. The adjustment of the bracket N' serves to compensate for wear not only of the friction-wheel, but also of the friction-rollers, if both wear alike. If they wear differently, adjustment therefor may be made by elongating or shortening the link $l$. The adjustment of the bracket N' is in such direction as to move the pinion $f^2$ tangentially to the gear $f$, so that its mesh therewith is not impaired.

For dynamos generating comparatively low potential the supplemental brushes G G, with their yoke H' and the pinion $j'$, may be omitted, since with a low electro-motive force the flashing at the commutator is so slight that the graduation of the extent of the brush contact on the commutator is not essential.

My improved regulator has the advantages of great simplicity and cheapness of construction, of perfect accessibility of parts, of abundant provision for all necessary adjustments, both in the original construction and for taking up subsequent wear, of great lightness of parts, so that their momentum is not liable to carry the brushes too far, and of providing improved means for preventing the movement of the brushes beyond the maximum. This last feature is of especial importance, since by my present invention the liability of injury to the apparatus in the hands of careless and meddlesome persons is greatly reduced. Even the wedging fast of the lever L in either its upper or lower position will not result in any injury to the regulator.

Figures 9, 10:
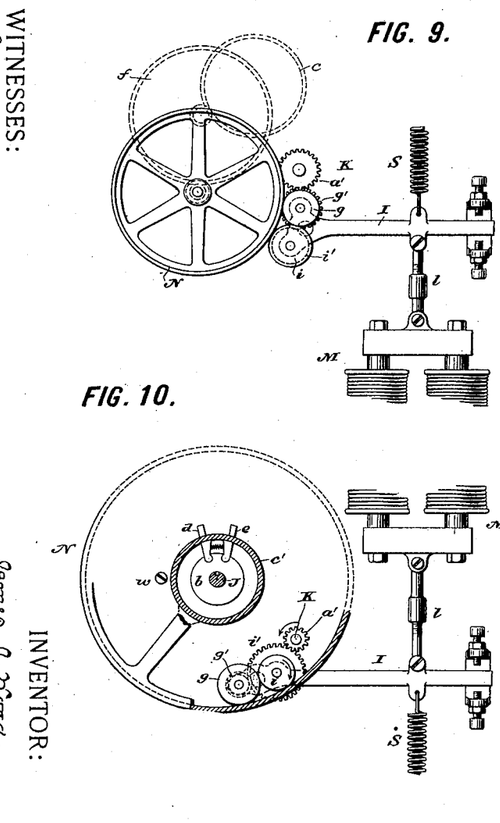
Figs. 9 and 10 are fragmentary front elevations answering to Fig. 1, and showing two different modified constructions.

It must not be inferred from the particularity of detail with which I have described the preferred construction of regulator embodying my invention that my invention is necessarily limited to these details, since, in fact, it is susceptible of considerable modification without departing from its essential features. For example, instead of employing the compound levers L I, the lever L may be omitted and the regulating magnet or solenoid may be connected directly to the lever I, which in this case should be extended to the right, as shown in Fig. 9. This arrangement will also necessitate that the magnet M shall be placed beneath the lever and the retracting-spring S above it, as shown in this figure.

The train of gears shown is not absolutely essential, nor is it essential that the friction-rollers $g$ $i$ shall bear against the external periphery of the friction-wheel N, as they might bear against a frictional surface on the inside of a projecting flange thereon. These modifications are shown in Fig. 10, where the wheels $c$ and N are constructed both as one wheel having two backwardly-projecting flanges—one, the flange $c'$, against which the friction-pawls operate, and the other the peripheral flange, against the inner surface of which the friction-rollers $g$ $i$ act. These rollers are both mounted on the lever I, which is connected directly with the magnet M above and with the retracting-spring S below. The positions of the rollers $i$ and $g$ are here reversed, the slow-motion roller $i$ being the one that is driven directly from the gear $a'$ on the armature-shaft, while the quick-motion roller $g$ is driven from the gear $i'$. The use of the two levers I and L is preferable, however, not only because of the greater facility of adjustment by the lengthening or shortening of the link $l$, but also because it admits of giving the magnet the degree of mechanical advantage that is desirable without extending the lever and magnet beyond the frame of the dynamo, and for the further reason that it admits of the magnet being arranged above the lever, so that its pull sustains the weight of its armature or moving member, and the retracting-spring is relieved of the work of holding up this weight, so that the spring may be made of the greatest lightness and have the utmost sensitiveness.

Figure 11:
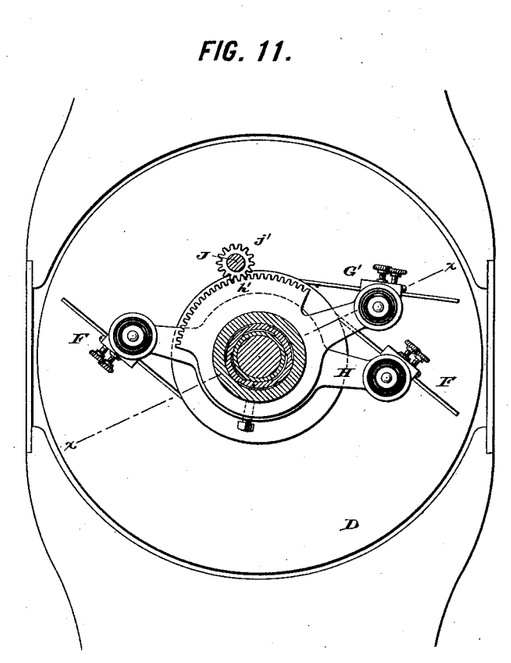
Fig. 11 is a fragmentary section answering to Fig. 2, and showing a modified application of my invention.

My invention is applicable not merely to the shifting of main and supplemental brushes of the dynamo, but also to the shifting of an auxiliary brush or brushes constituting the terminal or terminals of a shunt-circuit for exciting or varying the excitation of the field. The application of such auxiliary or shunt-terminal brushes to both constant-current and constant-potential dynamos is illustrated and fully described in my two pending applications for patents, Serial No. 291,354, filed November 20, 1888, and Serial No. 291,456, filed November 21, 1888. The application of my present invention to this purpose is shown in Fig. 11, wherein F F are the main-circuit brushes, held by a fixed yoke H so that they stand constantly at the maximum line, and G' is the auxiliary or shunt-terminal brush, carried by a movable yoke H', having a sector $h'$, engaged by a pinion $j'$ on the shaft J of the regulator.

I make no claim in this application to anything shown in my patent, No. 326,894, dated September 22, 1885, for current-regulators for dynamo-electric machines. The part of my present invention which involves the friction-pawl clutch $b$ $c'$ $d$ $e$ and stop $m$ or other equivalent disconnecting-clutch between the source of power and the brush-carrier might be applied in connection with the mechanism shown in that patent in lieu of the abutting stops $s$ $s'$ on the gear-wheel and lever shown therein.

I have described the friction-rollers $g$ $i$ as revolving in opposite directions. It is not essential, however, that they shall revolve in opposite directions relatively to each other, but in opposite directions relatively to the wheel N, so that when one roller is driving this wheel it will turn in the opposite direction to that in which it turns when the other is driving it.

I claim as my invention the following-defined improvements in automatic regulators for dynamo-electric machines, substantially as hereinbefore specified, namely:

1. The combination, with a dynamo-electric machine having movable commutator-brushes, of a current-regulator consisting of a shifting mechanism for moving said brushes between their maximum and minimum positions, an electro-motive device responding to changes in the circuit and connected to and controlling said shifting mechanism, a stop for arresting the brushes at the limit of their movement, and a separable connection between said mechanism and the brushes, constructed to slip upon the arrest of the brushes, whereby the movement of the shifting mechanism is uninterrupted, but its continued movement is impotent to carry the brushes farther.

2. In a current-regulator, the combination, with movable commutator-brushes and a shifting mechanism for moving them between their maximum and minimum positions, of a separable connection between the brushes and said mechanism, consisting of a clutch through which the motion is communicated to the brushes and a stop constructed to disconnect said clutch when the brushes reach the limit of their movement.

3. In a current-regulator, the combination, with movable commutator-brushes and a shifting mechanism for moving them between their maximum and minimum positions, of a separable connection between the brushes and said mechanism, consisting of a self-engaging friction-clutch through which the motion is communicated to the brushes and a stop constructed to disconnect said clutch when the brushes reach the limit of their movement in one direction, whereby the further movement of the mechanism in that direction is impotent to carry the brushes farther, but upon the beginning of the opposite movement the clutch re-engages and the brushes are carried in the opposite direction.

4. In a current-regulator, the combination, with movable commutator-brushes and a shifting mechanism for moving them between their maximum and minimum positions, of a separable connection between the brushes and said mechanism, consisting of driving and driven parts, and an intervening friction-pawl carried by the driven part and engaging the driving part in turning in one direction, and a stop arranged to arrest said pawl when the brushes reach the limit of their movement in that direction, whereby the driven part of said clutch and the brushes are stopped and freed from the driving part.

5. In a current-regulator, the combination, with movable commutator-brushes and a shifting mechanism for moving them between their maximum and minimum positions, of a separable connection between the brushes and said mechanism, consisting of driving and driven parts, and two intervening friction-pawls carried by the driven part and engaging the driving part in opposite directions, and a stop or stops arranged to arrest said pawls, respectively, at the opposite limits of the movement of the brushes, whereby the driving connection through the arrested pawl is severed and further movement in the same direction is impotent to move the brushes farther, but a movement in the reverse direction is immediately communicated through the other pawl to the brushes.

6. In a current-regulator, the combination, with movable commutator-brushes and a shifting mechanism for moving them, consisting of an electro-motive device responding to changes in the current and a clutching mechanism controlled thereby for connecting the brush-carrier in either direction to a source of power, of a separable connection between the brush-carrier and said shifting mechanism, consisting of a driving part or wheel having a flange, a driven part or disk connected to the brush-carrier, two friction-pawls pivoted to said disk and engaging said flange in opposite directions, respectively, and a stop or stops in the rotary path of said pawls arranged to arrest the respective pawls when the brushes reach the limit of their movement in either direction.

7. The combination, with a dynamo-electric machine for generating constant currents, of a current-regulator operating by the shifting of the commutator-brushes, consisting of a friction-wheel mounted on the frame of the dynamo, rotative on a fixed axis parallel with and adjacent to that of the armature-shaft, and connected to the brushes so that its rotary movement shall shift them, two continuously-revolving driving friction-rollers positively geared to the armature-shaft to revolve in opposite directions relatively to said friction-wheel and arranged on axes parallel thereto with their surfaces normally out of contact therewith and movable separately into contact therewith, a lever on which said rollers are mounted and by which they are movable into or out of contact with the friction-wheel, and a regulating electro-magnet with its moving member and retractile device mechanically connected to said lever.

8. In a current-regulator operating by the shifting of the commutator-brushes, the combination, with the brushes, of a friction-wheel connected to them so that its rotary movement shall shift them, two oppositely-revolving friction-rollers geared together and revolving at different surface speeds, movable into and out of contact with said wheel, and an electro-motive device responding to changes in the circuit and connected to said rollers, whereby by its movement in one direction or the other one or the other of said rollers is moved into driving contact with said wheel, and the latter is driven faster in one direction than in the other.

9. In a current-regulator operating by the shifting of the commutator-brushes, the combination, with the brushes, of a friction-wheel connected to them so that its rotary movement shall shift them, the armature-shaft, two oppositely-revolving friction-rollers geared to said shaft and driven therefrom at different surface speeds, movable into and out of contact with said wheel, the faster roller turning in such direction as to move the brushes away from the maximum position and the slower to move them toward the maximum, an electro-motive device responding to changes in the circuit, and a mechanical connection between the moving member thereof and said rollers, constructed to move the faster roller into driving contact with said wheel when the current exceeds the normal and the slower one into contact therewith when the current falls below the normal.

10. In a current-regulator operating by the shifting of the commutator-brushes, the combination, with the brushes, of a friction-wheel connected to them so that its rotary movement shall shift them, two oppositely-revolving friction-rollers, a lever carrying said rollers, a main operating-lever connected to said lever and adjustable relatively thereto to vary the inclination of the first-named lever, and hence to adjust the relative distances of the friction-rollers from the friction-wheel with reference to the normal mid-position of the operating-lever, and an electro-motive device responding to changes in the circuit, with its moving member connected to said operating-lever.

11. In a current-regulator operating by the shifting of the commutator-brushes, the combination, with the brushes, of a friction-wheel connected to them so that its rotary movement shall shift them, two oppositely-revolving friction-rollers, a lever carrying said rollers, a main operating-lever, an adjustable link connecting said levers, and an electro-motive device responding to changes in the circuit, with its moving member connected to said operating-lever and adapted to vibrate the same.

12. In a current-regulator operating by the shifting of the commutator-brushes, the combination, with the brushes, of a friction-wheel connected to them so that its rotary movement shall shift them, two oppositely-revolving friction-rollers movable into and out of contact with said wheel, an electro-motive device responding to changes in the circuit and connected to said rollers, whereby by its movement in one direction or the other one or the other of said rollers is moved into driving contact with said wheel, and a bearing for said wheel movable toward and from said rollers, whereby the relative positions of the wheel and rollers may be adjusted.

In witness whereof I have hereunto signed my name in the presence of two subscribing witnesses.

JAMES J. WOOD.

Witnesses:
ARTHUR C. FRASER,
GEORGE H. FRASER.